United States Patent [19]

Meyers

[11] Patent Number: 5,701,005
[45] Date of Patent: Dec. 23, 1997

[54] COLOR SEPARATING DIFFRACTIVE OPTICAL ARRAY AND IMAGE SENSOR

[75] Inventor: Mark M. Meyers, Hamlin, N.Y.

[73] Assignee: Eastman Kodak Company, Rochester, N.Y.

[21] Appl. No.: 579,532

[22] Filed: Dec. 27, 1995

[51] Int. Cl.⁶ .................................................. G01J 3/50
[52] U.S. Cl. .................... 250/226; 250/208.1; 359/574
[58] Field of Search ........................ 250/226, 201.8, 250/201.9; 359/570–575, 568–569, 364–366; 356/303–305, 333–334, 328; 369/109, 100; 396/111

[56] References Cited

U.S. PATENT DOCUMENTS

| | | | |
|---|---|---|---|
| 4,674,871 | 6/1987 | Shifrin | 356/328 |
| 4,690,506 | 9/1987 | Kita et al. | 359/575 |
| 4,994,664 | 2/1991 | Veldkamp | 250/216 |
| 5,002,393 | 3/1991 | Thevenon et al. | 356/333 |
| 5,038,216 | 8/1991 | Easterly et al. | 358/228 |
| 5,120,126 | 6/1992 | Wertz et al. | 356/71 |
| 5,233,174 | 8/1993 | Zmek | 250/201.9 |
| 5,256,868 | 10/1993 | Kaplan et al. | 250/208.1 |
| 5,340,978 | 8/1994 | Rostoker et al. | 250/208.1 |
| 5,352,886 | 10/1994 | Kane | 260/216 |
| 5,497,269 | 3/1996 | Gal | 359/615 |
| 5,526,338 | 6/1996 | Hasman et al. | 369/109 |
| 5,529,936 | 6/1996 | Rostoker | 437/2 |

*Primary Examiner*—Que Le
*Attorney, Agent, or Firm*—Edward Dugas

[57] ABSTRACT

In one embodiment a diffractive element, having at least one surface formed as a plurality of blazed diffractive features that are curved and decentered to focus and chromatically disperse incident light into Red Green and Blue spots. An array of the diffractive elements is disclosed for separating incident light from a color image to form Red, Green, and Blue, separations of the image without the use of filters.

7 Claims, 9 Drawing Sheets

COLOR SEPARATING DIFFRACTIVE OPTICAL ARRAY AND IMAGE SENSOR

FIELD OF THE INVENTION

The present invention relates to the field of color separation for use with a monochrome CCD or photodiode array.

BACKGROUND OF THE INVENTION

When utilizing CCD or photodiode arrays as electronic image sensors in scanners and cameras to form color images of a scene, the light incident on the photosensitive elements forming the CCD or the photodiode array must be separated into three color channels (red, green, blue or cyan, magenta, yellow). This is due to the fact that CCDs and photodiode arrays have broadband sensitivity, therefore any color selectivity is typically due to a filter being placed in the light path before the photosensitive elements. This can be accomplished by forming filters on top of the photosensitive elements or by using a filter wheel in front of a lens to form three sequentially filtered images of the scene. When utilizing a filter some fraction of the incident light is lost in order to allow only the color of interest onto the photosensitive elements. This forces the use of a relatively low F/# (high numerical aperture) lens in order to capture enough light to form a high quality image.

Another feature of electronic imaging sensors is that they typically have some amplifying and read out electronics formed nearby so the area of the photosensitive element is less than the area of the unit cell in which it resides (there is a non-photosensitive area around the element). Directing light from the non-photosensitive areas onto the photosensitive areas increases the light gathering efficiency of the sensor. Prior art techniques have used refractive concentrator lenses formed on the CCD array to concentrate light which would otherwise be incident on the non-photosensitive areas of the sensor onto the photosensitive areas.

When digitally sampled images are made with lenses which have resolutions which are higher than the Nyquist frequency of the sensor (½ the sampling spatial frequency) and the arrangement of the color pixels is uniform, high spatial frequency objects can appear to have high frequency color bands moving across them due to the spatial detail of the image, which is beyond the sensor's Nyquist frequency. This phenomena is known as aliasing in the digital image processing field. Aliasing is typically either tolerated or minimized by using an anti-aliasing birefringent blur filter formed with two quartz plates. This type of anti-aliasing filter creates four spots from one original spot and thereby reduces sharpness to the point where aliasing is not observed. However, this also causes reduced contrast at frequencies below the Nyquist frequency.

In U.S. Pat. No. 4,994,664, entitled "Optically Coupled Focal Plane Arrays Using Lenslets and Multiplexers" by W. B. Veldkamp, there is disclosed the use of an array of concentric diffractive lenses as a concentrator. Each concentric lens is located directly over a corresponding photosensitive element and concentrates light onto the photosensitive site which increases the light gathering ability of the solid state imaging device. This lens arrangement does not allow for color separation of the concentrated light or achieve a reduction in aliasing. Each of the lenses is formed as a rotationally symmetrical element which inhibits their use as a color separating element and prevents the correction of off-axis aberrations with asymmetric diffractive coefficients.

Another piece of prior art of interest is U.S. Pat. No. 5,340,978, entitled, "Image-Sensing Display Panels With LCD Display Panel and Photosensitive Element Array" by Rostoker et al., wherein in FIG. 8 there is disclosed an array of circular elements 808 which are used to separate incident light into red, green and blue components and to focus the components onto one of three photosensors 802a, 802b, or 802c. The arrangement shown does not efficiently utilize all of the incident light in that light frequencies falling between the three components will not be deflected to one of the photosensors and will therefore be lost. The lens elements described are decentered, rotationally symmetric, diffractive elements which do not provide the same degree of aberration correction as an asymmetric diffractive element. Furthermore, the invention does not disclose the use diffractive elements for the minimization of aliasing.

Neither of the referenced patents disclose a technique for compensating for the variation in angular subtense of a given color as a function of field angle. This variation would cause a shift in color balance and a change in the integrated intensity of the sensor array as a function of field angle with field angle being defined as the angle from the optical axis of the camera or scanner lens.

There is also no discussion of the location of CCD pixels across the array in the direction of the linear grating term as a function of the field angle to compensate for the change of diffraction angle as a function of the angle of incidence.

SUMMARY OF THE INVENTION

The present invention is directed to overcoming one or more of the problems set forth above. Briefly summarized, according to one aspect of the present invention there is provided a diffractive element having at least one surface formed as a plurality of blazed diffractive features that are curved so as to focus and chromatically disperse incident light.

Figure 1:
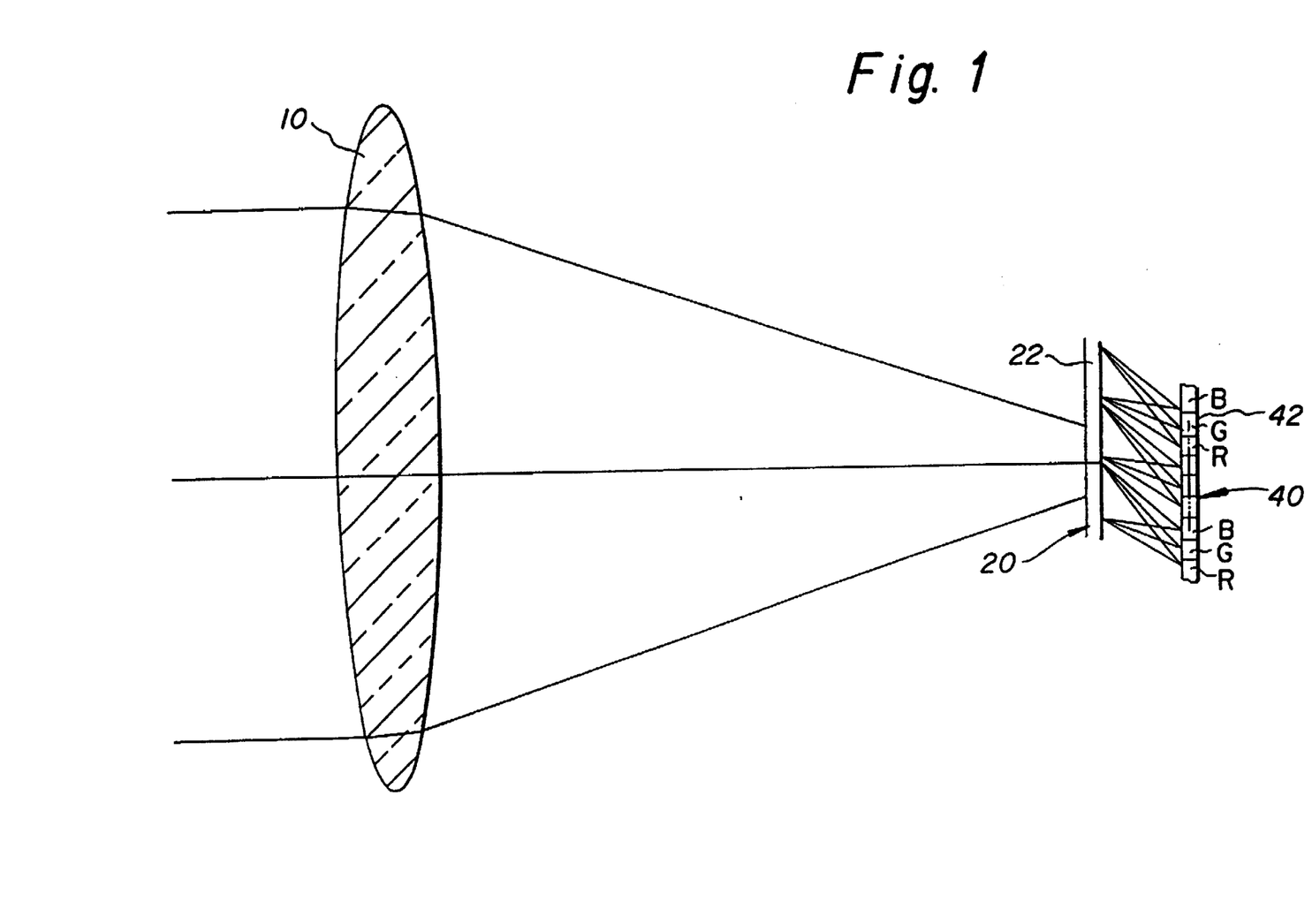
FIG. 1 illustrates an arrangement of the present invention utilizing the inventive diffractive array.

The invention consists of utilizing an array of diffractive elements with focusing and dispersive components to concentrate and disperse incident light into its component colors onto a CCD array without the need for an absorption filter over each element (see FIG. 1). Such an array simultaneously concentrates the light incident on a diffractive element onto the active area of the sensor (using symmetrical X and Y focusing powers or using anamorphic focusing power) while dispersing the light into its component colors and potentially providing a blurring function to act as an anti-aliasing device by allowing some undiffracted light from adjacent pixels to be incident on a nearby CCD element. This will effectively blur the size of the spot.

The diffraction efficiency of a given element can be controlled in a reproducible fashion by changing the surface profile of the diffractive element. For instance, using a binary (square wave profile) grating causes 41% of the light to be diffracted into the ±1 diffraction orders while the rest is spread into other orders. A full diffractive blaze profile, such as disclosed in U.S. patent application Ser. No. 175,708 filed Dec. 29, 1993, entitled "Hybrid Refractive/Diffractive Achromatic Camera Lens", can achieve 100% diffraction efficiency at its design wavelength, although 95 to 98% efficiency is more readily achieved in practice. By varying the surface profile, the intensity distribution of the diffraction pattern can be modified to produce nearly any desired blur pattern to provide the anti-aliasing function.

The above and other objects of the present invention will become more apparent when taken in conjunction with the following description and drawings wherein identical reference numerals have been used, where possible, to designate identical elements that are common to the figures.

3

Advantageous Effect of the Invention

The use of an array of diffractive elements to disperse and concentrate the light on a CCD array while also providing an anti-aliasing function has several advantages. First, it allows for an increase in the sensitivity of the CCD array through the elimination of the light loss due to the absorption filters traditionally used for color CCD arrays. The elimination of the absorption filters also increases the manufacturing yield of the CCD array because there is no need to pattern the filter elements over the photosensitive elements. It also allows for the concentration of light onto the active area of the detector rather than allowing it to fall on the inactive areas between the photosensitive elements without having to form concentrating lenslets directly on the CCD array. Another advantage of the diffractive. element array is that any aliasing will be invariant with color and will not produce color varying fringing patterns. A further aspect of the diffractive array is that the undiffracted light from one pixel of incident light will provide a blurring function for other pixels in a fashion similar to that utilized in birefringent blur filters. All of these features are obtained by aligning one array of diffractive elements at a given height over the detector array.

DETAILED DESCRIPTION OF THE INVENTION

Referring to FIG. 1, an image capturing lens 10 which may be part of image capturing device such as a camera or scanner focuses light onto a diffractive array 20. The diffracted light from the array 20 is incident onto an array of photosensitive elements such as a CCD array 40. In the preferred embodiment of the invention the CCD array 40 is formed as a grid of monochrome photosensitive elements 42 that receive primarily, red, green, or blue light dependent on their displacement from the center of the diffractive array 20.

Figure 2:
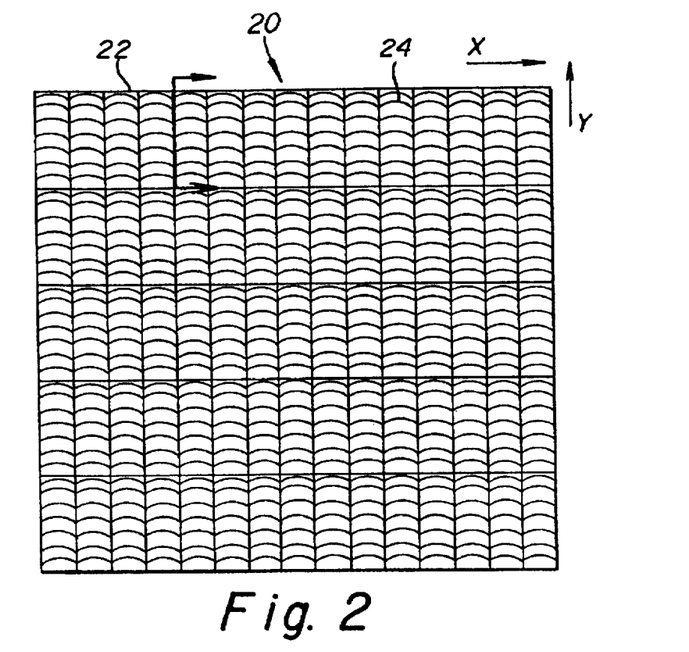
FIG. 2 illustrates the diffractive array in a top view.

FIG. 2 is a top view of the diffractive array 20 illustrating an array of rectangular diffractive elements 22. Each diffractive element 22 is formed in a transmissive substrate such as quartz, optical glass or silicon dioxide. Incorporated into each element is a plurality of blazed diffractive features 24 which are curved so as to focus and chromatically disperse incident light. The shape of the diffractive features 24 is based on combining a linear grating term and diffractive focusing and aberration correcting terms.

Figure 3:
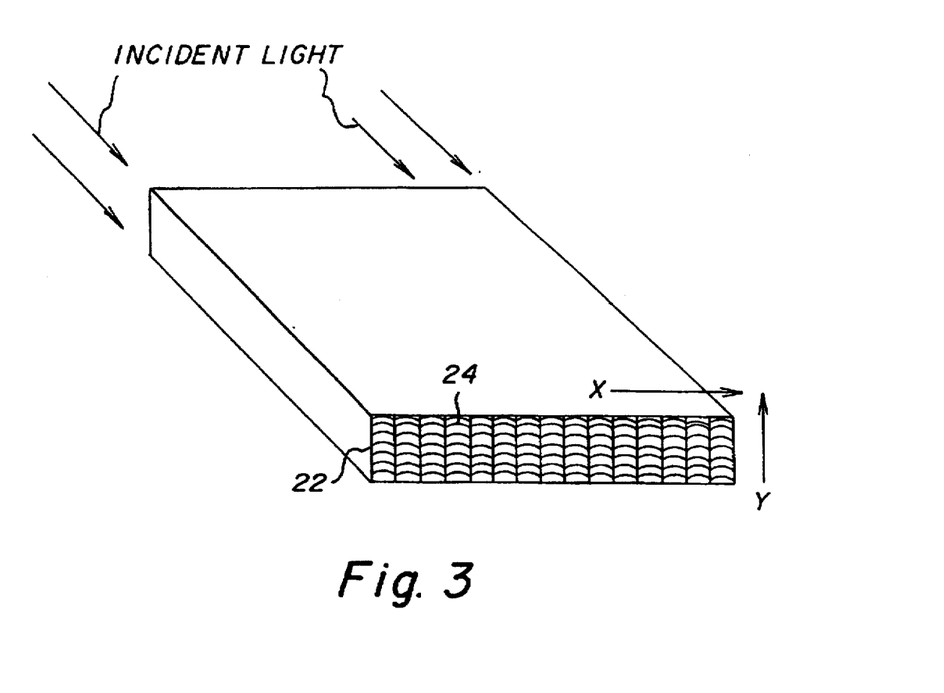
FIG. 3 is a perspective view of a single row of the array illustrated in FIG. 2.

FIG. 3 is a perspective view of one row of the array 20 providing a clearer view of the diffractive elements 22 and their diffractive features 24.

Figure 4A:
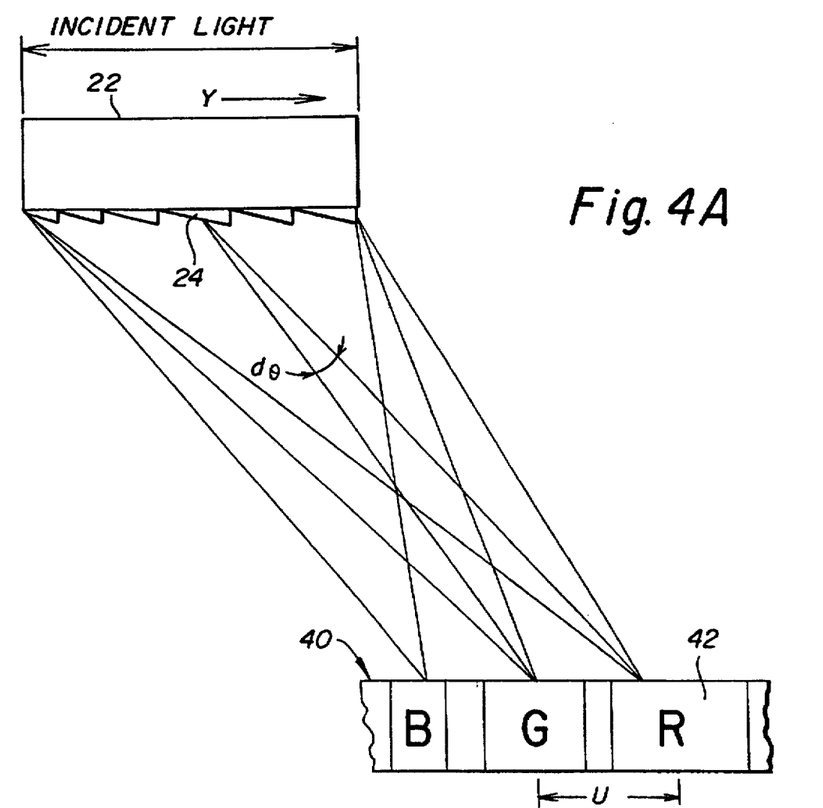
FIGS. 4A and 4B are schematic illustrations of the dispersion of incident light from a single rectangular diffractive element and a perspective view of the surface profile of the diffractive element, respectively.
Figure 4B:
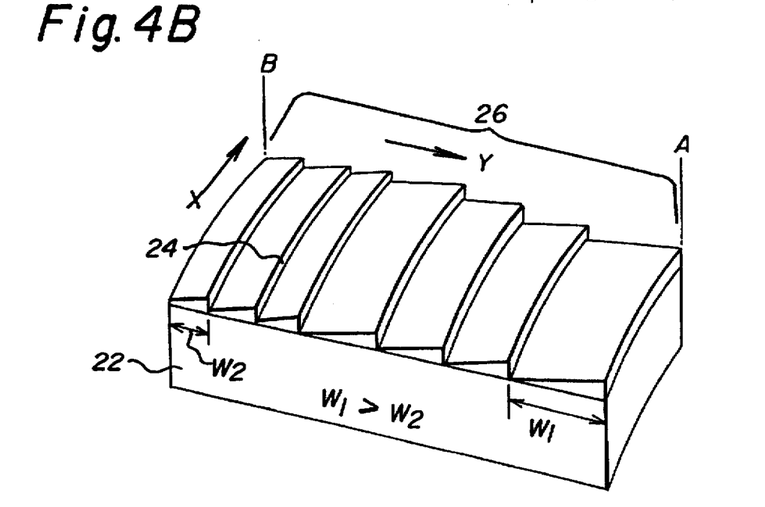

FIG. 4 provides an enlarged view of a diffractive element 22 illustrating the separation of an incident light into a continuum of colors with the major colors of interest being Red, Green, and Blue, where the central wavelengths are shown in TABLE 2. The CCD array 40 of FIG. 2, is comprised of a plurality of photosites 42 which intercept the light whose color is determined by the angular location of the photosensitive elements with respect to the diffractive elements 22. Note that each of the photosensitive elements differs in size dependent on its color assignment.

Figure 5A:
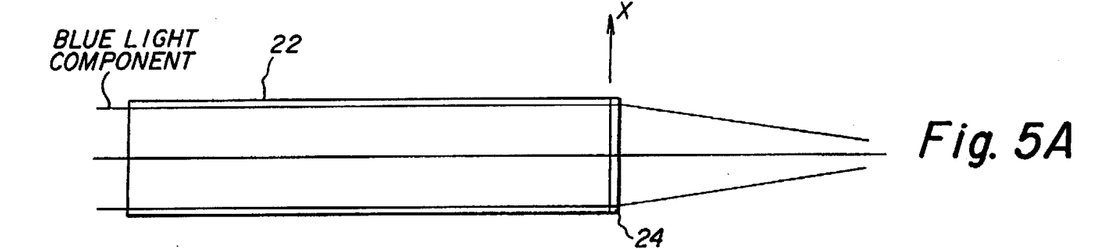
FIGS. 5A, 5B, and 5C, illustrate the concentration of the Blue, Green and Red, light as they pass through a single rectangular diffractive element in the X direction.
Figure 5B:
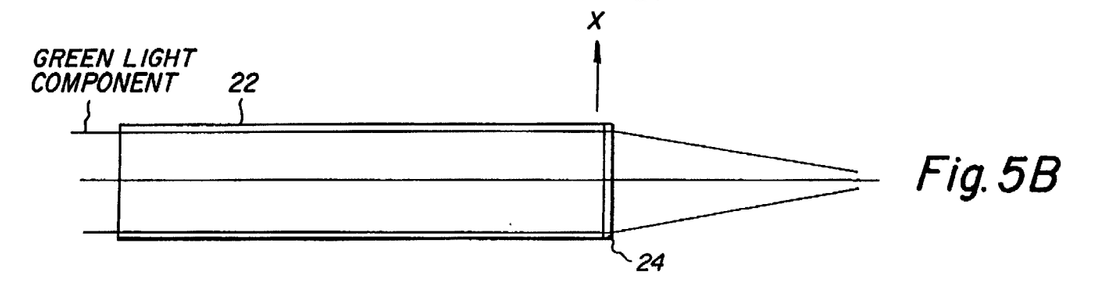
Figure 5C:
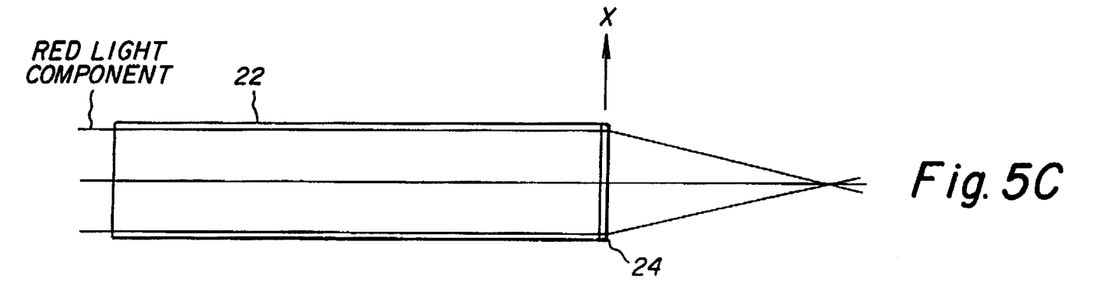

FIGS. 5A, 5B, and 5C demonstrates the concentration of light for the Blue, Green, and Red wavelengths, respectively, by the diffractive element 22, in a direction perpendicular to the view in FIG. 4A to illustrate that the light from the elements is substantially concentrated and not color dispersed as shown in FIG. 4A.

Figure 6:
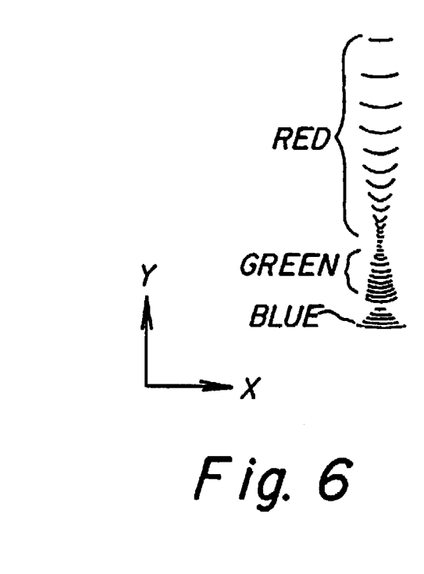
FIG. 6 illustrates the dispersion of a white light incident on the diffractive element into Red, Green and Blue spots.

FIG. 6 illustrates the separation of three discreet wavelengths, red, Green, and blue, into the spots labeled Red, Green and Blue, respectively. By controlling the size of the photosensitive detector material forming the photosensitive elements 42 to correspond to the size of its assigned spot an efficient color detector is formed. For example, the size of the photosensitive detector material positioned to receive the Red spot is substantially larger than the size of the photosensitive material assigned to receive the Blue spot.

Figure 7:
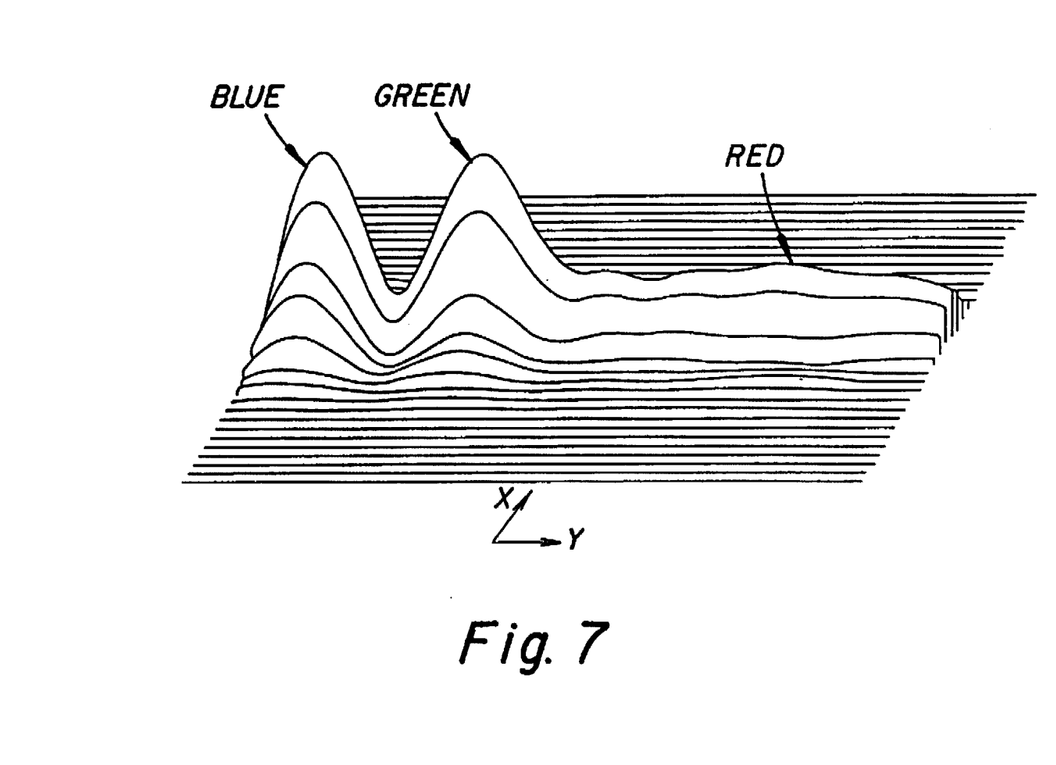
FIG. 7 is a chart illustrating the intensity distribution of the Red, Green, and Blue, spots of FIG. 6.

FIG. 7 illustrates byway of an intensity profile the separation and concentration of the Red, Green, and Blue light as was shown in FIG. 6. The Blue light is spread over the smallest area, but is shown with the highest peak intensity while the Red light is shown spread over the largest area with the lowest peak intensity. To achieve substantially the same amount of power from the assigned photosensitive elements it is obvious that the element assigned to receive the Red light would have to have a larger area than the element assigned to receive the Blue light as the peak intensity provided by each light spot is inversely proportional to the area. Also to be observed is that the spacing between photosensitive elements is adjusted to compensate for the variations of angular separation as a function of field angle (more clearly seen by reference to FIG. 4A).

Figure 8:
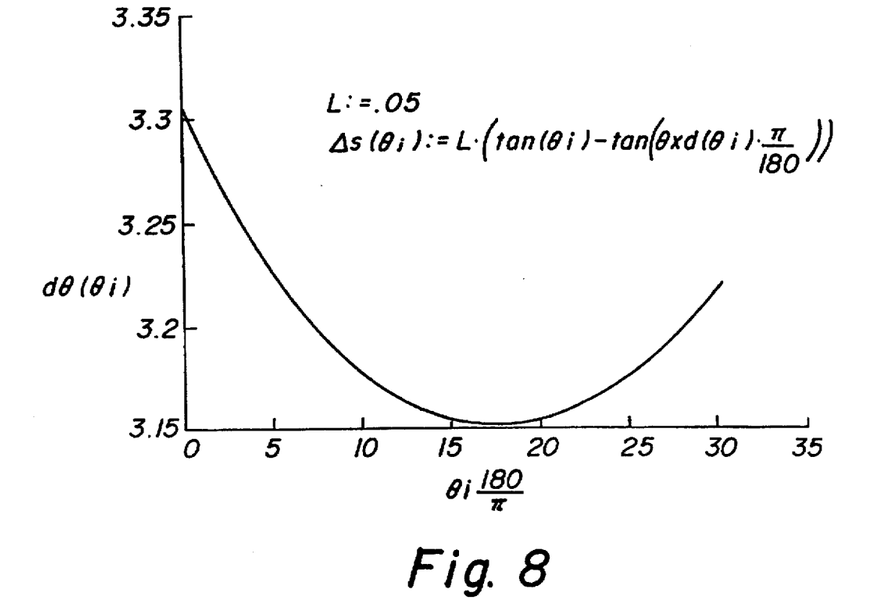
FIG. 8 is a chart illustrating the variation of angular separation between the Red and the Green light as a function of the angle of incidence.

More specifically, referring to FIG. 8, the chart illustrates the angular separation, $d\theta$, of Red and Green light as a function of angle of incidence, $\theta_i$. FIG. 4A indicates, by the doubled arrowed line, the angular separation referred to as $d\theta$. The spacing U between the Green and Red photosensitive elements 42 is adjusted as a function of $\theta_i$. For example, the spacing U, will be larger for each associated Green and Red pair of photosensitive elements when the incident angle is small, 0°, and becomes smaller as the incidence angle approaches 17° and increases as $\theta_i$ approaches 35°. In a like manner, although not shown in the chart of FIG. 8, the spacing between the Blue and the Green photosensitive elements varies as a function of the angle of incidence. However, one can compensate for the slight variation of angular separation by changing the frequency of the linear grating term (DF2 in Table 1) as a function of position across the array.

Figure 9:
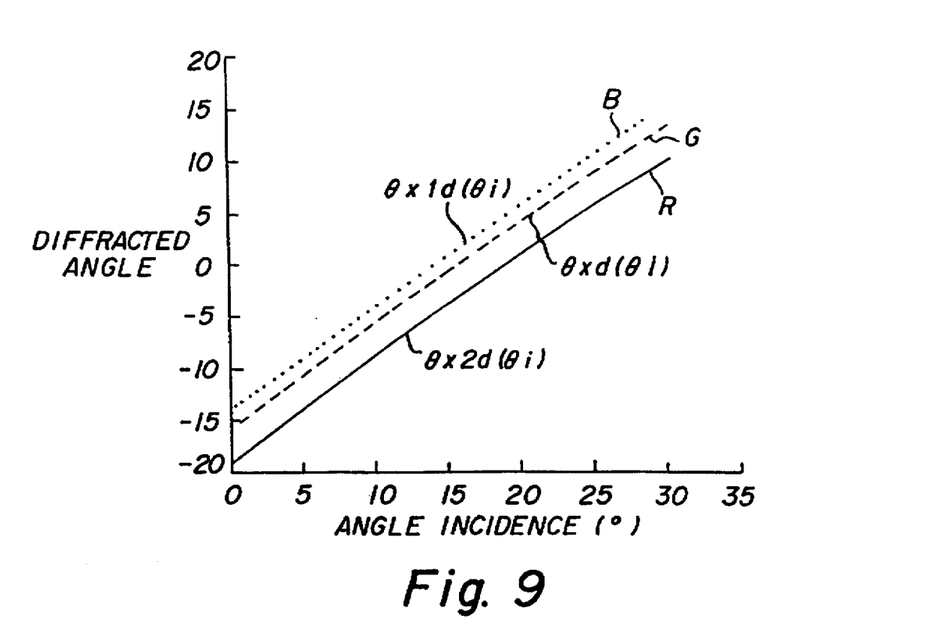
FIG. 9 is a chart illustrating the exit angle of the Red, Green, and Blue light as a function of the angle of incidence.

The chart of FIG. 9 illustrates that the angular separation between the Red, Green, and Blue light is approximately a constant, however, the diffracted angle is nearly a linear function of the angle of incidence. The position of each photosensitive element 42 on the CCD array 40 is adjusted to intercept its assigned color.

Figure 10:
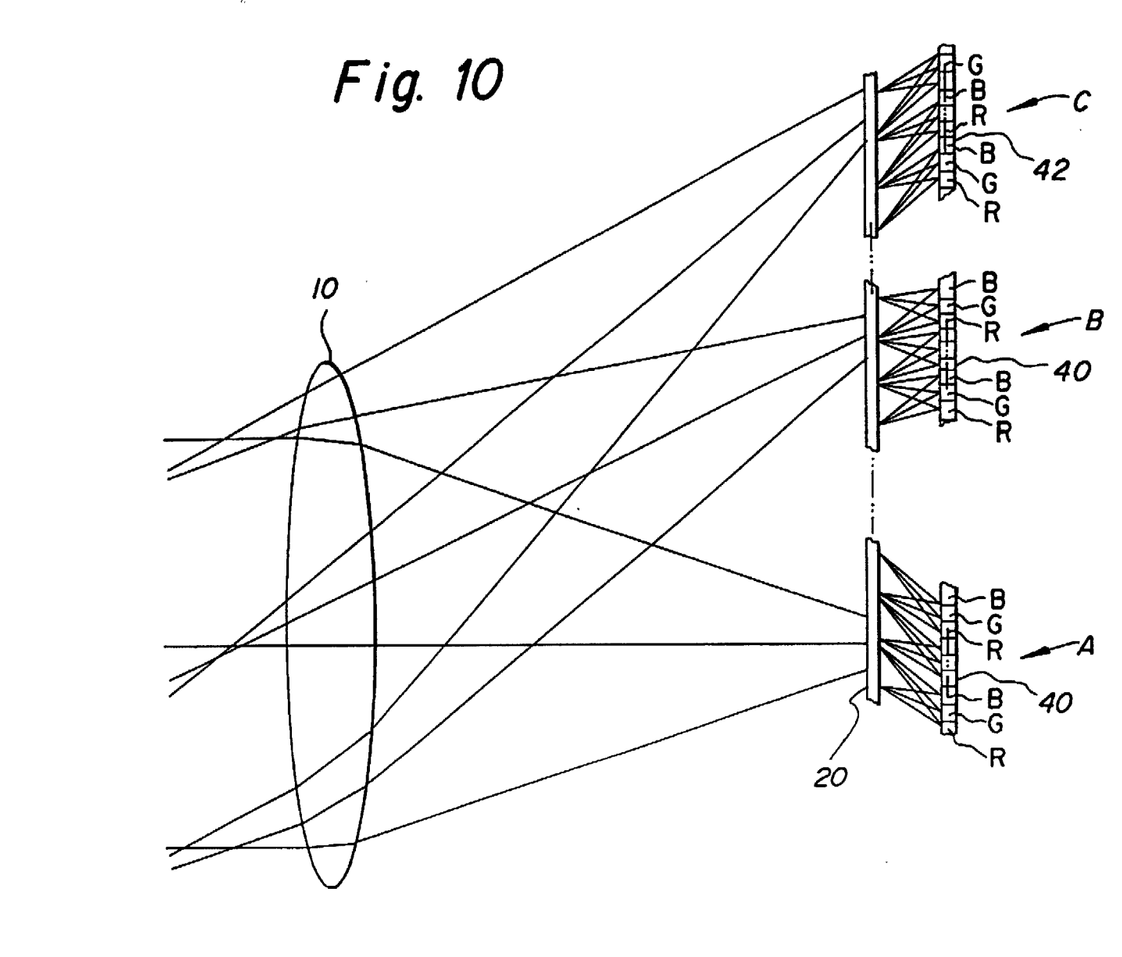
FIG. 10 is an optical ray diagram illustrating the variation of the exiting angle across the CCD array as a function of the field angle.

FIG. 10, in conjunction with the chart of FIG. 9, illustrates the variation in the diffracted angle as a function of incidence angle. More specifically, focusing on the A labeled portion of the CCD array 40 and its associated portion of the diffractive array 20 it can be seen that the diffracted angle for Green light is −15° and in the B labeled portion it is approximately 0°, and in C labeled portion the angle is approximately 15°. This translates, physically, into positioning the photosensitive elements 42 at sites that will insure a maximum absorption of the light component of interest.

Figure 11:
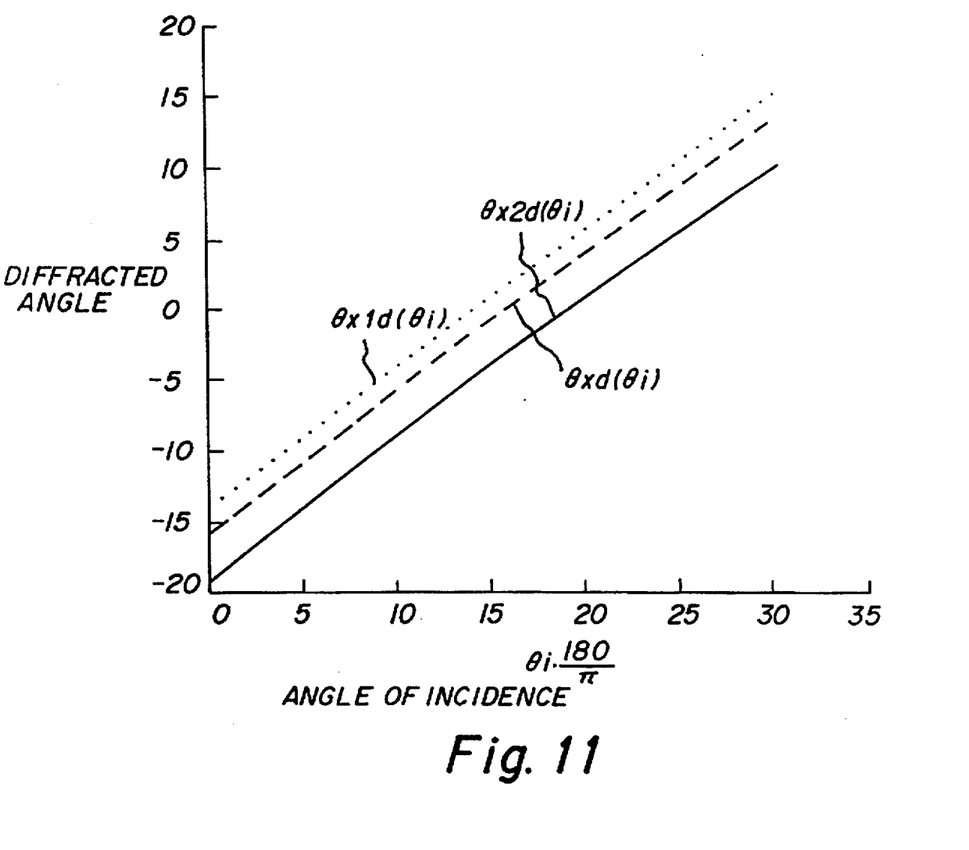
FIG. 11 is a chart illustrating the displacement of the chief ray in the Red, Green, and Blue with respect to the center of the diffractive element.

The graph of FIG. 11, shows the displacement of the central ray of the Green bundle of light as a function of field angle. This variation can be compensated for by adjusting the spacing of the corresponding CCD photosensitive elements 42 or adjustment can be made to the DF2 term of Table 1.

The surface profile 26 of each diffractive element 22 can be described as a phase function $$\phi(x, y) = \Sigma K_j * (x^n + y^m)$$

where
m=0, 1 .. 10
n=0, 1 .. 10

$K_j$=Coefficient for jth term in expansion (maximum j=65)

An example of a preferred embodiment of an off-axis asymmetric diffractive element 22 is listed in the table below.

TABLE 1

| LENS DATA | | | |
|---|---|---|---|
| SURFACE | THICKNESS | AP. RADIUS | GLASS |
| 0 | 1.0000e + 20 | | AIR |
| 1 | 0.1 | 0.01 | BK7 |
| 2 | 0 | 0.01 | AIR |
| DOE | | | |
| DIFF. ORDER = 1 | DESIGN λ = 0.546070 | | |

| TERM | VALUE | COEFFICIENT OF |
|---|---|---|
| DF2 | 0.500000 | Y |
| DF3 | −7.290407 | $X^2$ |
| DF5 | −8.403396 | $Y^2$ |
| DF10 | 96.111224 | $X^4$ |
| DF12 | 2.8744e + 03 | $X^2Y^2$ |
| DF14 | −29.089917 | $Y^4$ |
| DF21 | 0.014915 | $X^6$ |
| DF27 | 0.063802 | $Y^6$ |
| 3 | 0.05 | AIR |
| 4 | IMAGE PLANE | |

TABLE 2

| WAVELENGTHS | | |
|---|---|---|
| GREEN | BLUE | RED |
| 0.546070 | 0.486130 | 0.656270 |

The diffractive element 22 is placed over an adjacent photosensitive site 42 (pixel area) and given a carrier frequency (linear grating term) and the corresponding focal length is calculated for a given height above the CCD array 40 and the desired concentration ratio. If desired, the focusing power can be different in the x and y directions to allow for various concentrating geometries corresponding to different pixel shapes. Anamorphic aspheric terms can be used to correct for aberrations in the focused wavefront.

The focal length of a diffraction element 22 is proportional to the wavelength of light being used and can be expressed as $$f(\lambda) = (\lambda_c/\lambda) * f_c.$$

where
$\lambda_c$=central wavelength of the design
$\lambda$=wavelength of interest
$f_c$=focal length at the central wavelength The diffraction of a ray through the center of the aperture of the diffractive element 22 is controlled by the carrier frequency term. The diffraction angle of the central ray is calculated from the grating equation to be:

$$\sin\theta_x - \sin\theta_i = m\lambda/d$$

where
m=diffraction order (0,±1,±2, ... )
$\theta_i, \theta_x$=angles of incidence and exiting ray
d=grating groove spacing (this term can be related to the polynomial form of the phase expression (term DF2)).

By adjusting the carrier frequency (=1/d) and the spacing between the diffractive element 22 and the detector array 40 one can control how much wavelength dispersion the grating imparts to the incident wavefront and where the central ray at the central wavelength ends up on the detector array 40. The spatial carrier frequency of the diffractive elements 22 can be varied across the array to compensate for the effect of the changing angle of incidence across the detector array. It can also be varied to allow the use of rows or columns of pixels which only have green and red separations, or green and blue separations to allow for different resolutions at any given color.

The spectral weighting of a given color is related to angular subtense of the pixel as seen from the diffractive element 22. It is also related to the fraction of the total possible area at a given angle which is occupied with active photodetector sites. This area weighting can be used to tailor the relative spectral response in any given wavelength band. The width of an angular region for a given spectral band can be found from the expression for the angle of diffraction due to the carrier frequency term (1/d)

$$\sin\theta_{x1} - \sin\theta_{i1} = m\lambda_1/d$$

$$\sin\theta_{x2} - \sin\theta_{i2} = m\lambda_2/d$$

for a given angle of incidence, this reduces to $$\sin\theta_{x1} - \sin\theta_{x2} = m(\lambda_1 - \lambda_2)/d$$

for a separation of the diffractive element 22 to detector element 42 of S, the width of the pixel on the detector array 40 to subtend a spectral width of $\Delta\lambda=\lambda_1-\lambda_2$ along the direction of the spectral dispersion is given by $$x=S*(\tan\theta_{x1}-\tan\theta_{x2}).$$

for a block of wavelengths $(\lambda_1-\lambda_2)$.

The concentration function is performed by imparting focusing power to the diffractive element. The focusing power is related to terms proportional to $r^2$ in the diffractive phase polynomial. From the phase polynomial one can see there are $x^2$ and $y^2$ terms for the x and y directions (see Table 1). Therefore, the illumination concentration function can be performed to different degrees for the x direction (see FIGS. 5A, 5B, and 5C)and the y direction (see FIG. 4A). Since the diffractive element is off-axis in one direction and on-axis in the other direction the asymmetric aspheric phase terms can be adjusted to correct for different magnitudes of aberrations in the different directions.

Figure 12A:
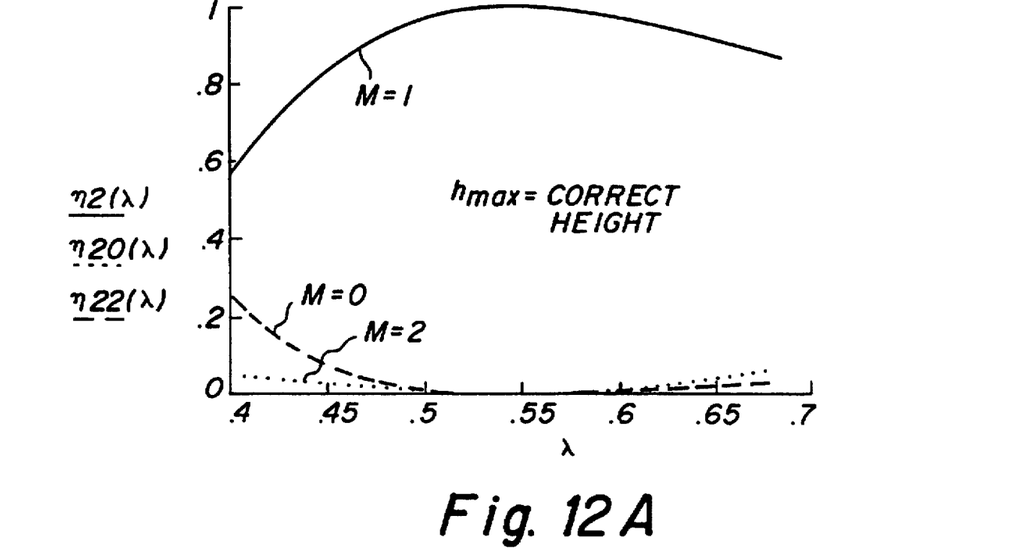
FIGS. 12A and 12B are graphs illustrating the diffraction efficiency as a function of wavelength for a diffractive feature height of maximum efficiency and a height of half of the maximum efficiency height, respectively.
Figure 12B:
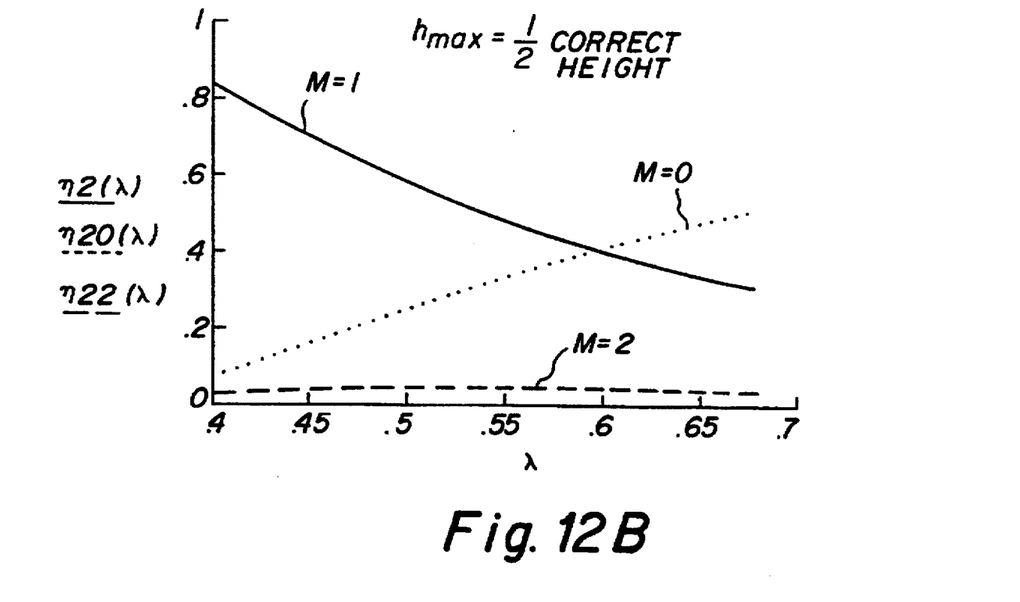

The diffraction efficiency of a diffractive element 22 is a strong function of the shape and height of the diffractive element. For a first order diffractive surface the diffraction efficiency is given by $$\eta(\lambda)=\text{sinc}^2(\alpha-m)$$

where
  m=diffraction order
  α=wavelength detuning parameter
  $\alpha=\lambda_0(n(\lambda)-1)/\lambda(n_0-1)$
and
  $h_{max}=m*\lambda_0/(n_0-1)$=peak height of the diffractive groove The maximum efficiency of a first order diffractive surface is 100% at the central wavelength. However, the efficiency falls off as the wavelength is detuned from the central wavelength (see FIG. 12A). Therefore, there is always some undiffracted light with a first order diffractive surface. By changing the shape of the diffractive surface or by changing the height of the diffractive surface (see FIG. 12B) the efficiency of the diffractive surface can be tailored to allow a desired fraction of the incident light to be undiffracted which will allow for the blurring of the focused spot which will give the diffractive array an anti-aliasing property.

The invention has been described with reference to preferred embodiments. However, it will be appreciated that variations and modifications can be effected by a person of ordinary skill in the art without departing form the scope of the invention.

Parts List 10 image capturing lens
20 diffractive array
22 diffractive element
24 diffractive feature
26 surface profile
40 CCD array
42 photosensitive elements

What is claimed is:

1. A color sensor comprising:

a diffractive element having at least one surface formed as a plurality of blazed diffractive features that are elliptically curved and decentered so as to angularly disperse and focus incident light into spectral components based on the wavelength of the incident light; and a plurality of photosensitive elements positioned and sized to receive the dispersed spectral components of the incident light.

2. The color sensor according to claim 1 wherein the angularly dispersed incident light is spectrally dispersed into spots of Red, Green, and Blue light and at least one photosensitive element is positioned to receive a spot of light.

3. A color sensor array comprising:

an array of diffractive elements having at least one surface formed as a plurality of blazed diffractive features that are elliptically curved and decentered so as to angularly disperse and focus incident light into spectral components based on the wavelength of the incident light; and an array of photosensitive elements positioned and sized to receive the angularly dispersed spectral components of the incident light.

4. The sensor according to claim 3 wherein the angularly dispersed incident light is spectrally dispersed into spots of Red, Green, and Blue light with at least one photosensitive element being positioned at an associated spot.

5. The sensor according to claim 4 wherein the size of each photosensitive element is a function of the size of its assigned spot.

6. The sensor according to claim 3, wherein the spacing between photosensitive elements accommodates for the variation in angular separation as a function of field angle from a central incident light ray through said array of diffractive elements.

7. The sensor according to claim 3 wherein the spacing between the photosensitive elements of said array is constant and the surface profile of the diffractive elements is adjusted as a function of position in the diffractive array so as to angularly disperse and focus incident light onto associated photosensitive elements.

* * * * *

UNITED STATES PATENT AND TRADEMARK OFFICE
CERTIFICATE OF CORRECTION

Page 1 of 1

| | |
|---|---|
| PATENT NO. | : 5,701,005 |
| APPLICATION NO. | : 08/579532 |
| DATED | : December 23, 1997 |
| INVENTOR(S) | : Mark M. Meyers |

It is certified that error appears in the above-identified patent and that said Letters Patent is hereby corrected as shown below:

ON THE TITLE PAGE

Insert the following priority claim after item (22):

-- Related U.S. Application Data

(60) Provisional application No. 60/000,292, filed on June 19, 1995. --

Signed and Sealed this
Eighth Day of April, 2014

Michelle K. Lee
*Deputy Director of the United States Patent and Trademark Office*